(12) United States Patent
Thibodeau

(10) Patent No.: US 11,161,293 B2
(45) Date of Patent: Nov. 2, 2021

(54) BLOW NOZZLE WITH HOLES FOR DIRECTIONAL BLOWING

(71) Applicant: DT Inventions, Houston, TX (US)

(72) Inventor: James Alfred Thibodeau, Gahanna, OH (US)

(73) Assignee: DT INVENTIONS, Houston, TX (US)

( * ) Notice: Subject to any disclaimer, the term of this patent is extended or adjusted under 35 U.S.C. 154(b) by 0 days.

(21) Appl. No.: 16/786,243

(22) Filed: Feb. 10, 2020

(65) Prior Publication Data

US 2021/0245415 A1 Aug. 12, 2021

(51) Int. Cl.
*B29C 49/58* (2006.01)
*B29C 49/60* (2006.01)
*B29L 31/00* (2006.01)

(52) U.S. Cl.
CPC ...... *B29C 49/60* (2013.01); *B29C 2049/5806* (2013.01); *B29C 2049/6027* (2013.01); *B29C 2049/6072* (2013.01); *B29L 2031/712* (2013.01)

(58) Field of Classification Search
CPC . B29C 49/58; B29C 2049/5803; B29C 49/60; B29C 2049/6027; B29C 2049/6072; B29C 2049/5841
See application file for complete search history.

(56) References Cited

U.S. PATENT DOCUMENTS

| | | | | | |
|---|---|---|---|---|---|
| 3,466,702 | A | * | 9/1969 | Stenger | B29C 49/48 425/215 |
| 3,899,279 | A | * | 8/1975 | Hudson | B29C 49/76 425/525 |
| 4,234,299 | A | * | 11/1980 | Kuenzig | B29C 49/58 264/533 |
| 6,221,305 | B1 | * | 4/2001 | Lopez | B29C 49/58 264/533 |
| 2003/0098526 | A1 | * | 5/2003 | Krishnakumar | B29C 49/783 264/516 |
| 2004/0108627 | A1 | * | 6/2004 | Schumann | B29C 49/18 264/535 |

* cited by examiner

*Primary Examiner* — Robert B Davis
(74) *Attorney, Agent, or Firm* — Osha Bergman Watanabe & Burton LLP

(57) ABSTRACT

A blow nozzle for supplying compressed air to the internal cavity of a preform, the blow nozzle including a tube having a first layer, a second layer, and a third layer, the first layer being radially wider and having a larger diameter than the second layer, the second layer being disposed between the first and third layers, and the second layer being radially wider and having a larger diameter than the third, and a plurality of holes disposed on the third layer for directional blowing of the compressed air into the preform, when the nozzle is inserted into a neck opening of the preform and rests in a blow molding position.

16 Claims, 5 Drawing Sheets

BLOW NOZZLE WITH HOLES FOR DIRECTIONAL BLOWING

The present invention relates to a method and device for forming a container. More specifically, the present invention relates to a method and device for forming a container from a preform with a blow nozzle that facilities directional blowing of air.

BACKGROUND OF INVENTION

Conventionally, numerous types of containers, including plastic bottles for holding fluids, are formed by blow-molding. An exemplary process can produce a plastic bottle, for example, a PET bottle. Such a bottle can be produced from a preform which has an elongated cylindrical body, which is connected to a neck section with a pour opening, in which the preform, which has been produced in a plastic injection process or an extrusion process, is placed in the mold cavity of a blow mold and inflated using a blow nozzle by an injection blow molding or injection stretch blow molding process.

Typically, the blow nozzle used in the injection blow molding process or injection stretch blow molding process has one through hole through which compressed air is blown straight into the preform to blow the preform into a container.

SUMMARY OF INVENTION

In general, in one aspect, embodiments disclosed herein are directed to a blow nozzle for supplying compressed air to the internal cavity of a preform, the blow nozzle including a tube having a first layer, a second layer, and a third layer, the first layer being radially wider and having a larger diameter than the second layer, the second layer being disposed between the first and third layers, and the second layer being radially wider and having a larger diameter than the third, and a plurality of holes disposed on the third layer for directional blowing of the compressed air into the preform, when the nozzle is inserted into a neck opening of the preform and rests in a blow molding position.

In general, in one aspect, embodiments disclosed herein are directed to a method for inflating a container from a preform using a blow nozzle, the method involving obtaining a blow nozzle including a tube with a first layer, a second layer, and a third layer, the first layer being radially wider and having a larger diameter than the second layer, the second layer being disposed between the first and third layers, and the second layer being radially wider and having a larger diameter than the third, and a plurality of holes disposed on the third layer of the blow nozzle for directional blowing of the compressed air into the preform, inserting the blow nozzle into the preform into a blow molding position such that the bottom of the third layer of the blow nozzle is between the upper attachment point of the handle and the lower attachment point of the handle, just below the upper attachment point of the handle, and flowing compressed air through the plurality of holes of the blow nozzle such that the plurality of holes facilitates directional blowing of the compressed air to form the container.

BRIEF DESCRIPTION OF DRAWINGS

Without restricting the full scope of this invention, the preferred form of this invention is illustrated in the following drawings.

DETAILED DESCRIPTION

Figure 1:
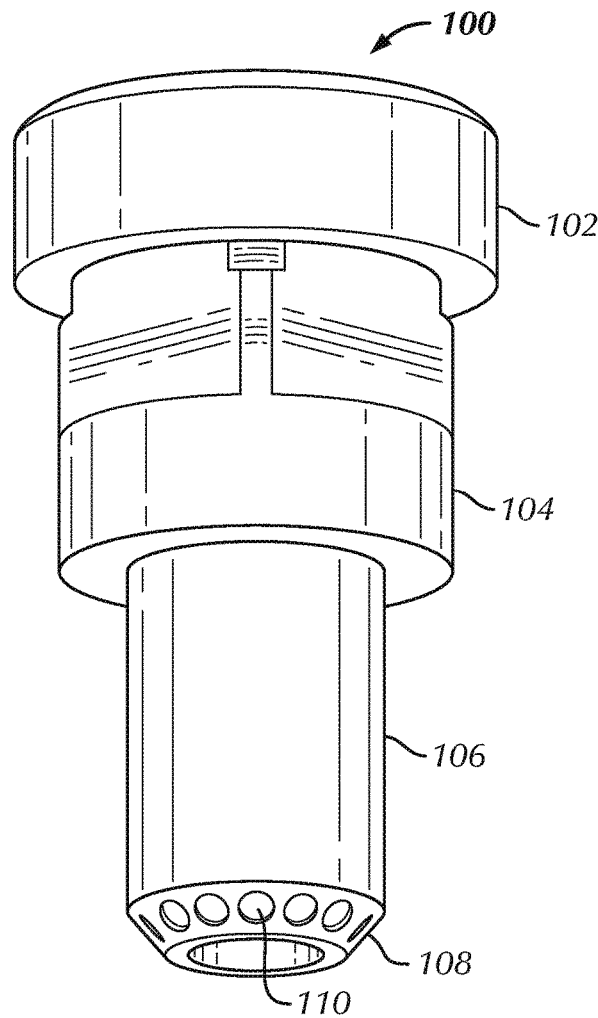
FIG. 1 depicts a blow nozzle for directional blowing of a preform into a container in accordance with one or more embodiments disclosed herein.

The following description is demonstrative in nature and is not intended to limit the scope of the invention or its application of uses. There are a number of significant design features and improvements incorporated within the invention.

Injection blow molding is used for the production of hollow objects in large quantities. The main applications are bottles, jars, and other containers. In a pre-injection stage, the polymer is fed into the extruder and plasticizes plastic pellets into molten polymer. In an injection stage, the molten polymer is fed into a manifold where it is injected through nozzles into a hollow, heated preform mold. The preform mold forms the external shape and is clamped around a core rod which forms the internal shape of the preform. Next, in a blowing stage, the preform mold opens and the core rod is rotated and clamped into the hollow, chilled blow mold. The core rod opens and allows compressed air into the preform, which inflates into the finished product shape. After the cooling cycle, the blow mold opens and the core rod is rotated to the ejection position. The finished product is ejected off the core rod.

Stretch blow molding is a modification of injection blow molding process and is also referred to as injection stretch blow molding (ISBM). Stretch blow molding processes produce biaxial orientation in the blown article. Stretch blow molding provides for axial orientation by stretching the preform axially before or during blowing. This is accomplished by a stretch rod that is advanced axially inside the preform at a controlled rate. Stretch blow molding is divided into two different categories: single-stage and two-stages. Single-stage process is done using one machine, while in a two-stage process, preforms are premade prior to the blow molding process.

In single-stage injection stretch molding parison is injected from the extruder into preform mold where the plastic is cooled to form the preform. The preform is then reheated and placed in the bottle mold. The preform is stretched by extending the core rod. Compressed air is then blown into the stretched parison to expand to the shape of the mold. The blown container is then cooled and ejected.

In the two-stage process, premade preforms are placed in preform heaters to allow then to get soften. The mold is opened allowing softened preform to be inserted, after which the mold is closed. The preform is then stretched as described above. Compressed air is then blown into the stretched preform to expand to the shape of the mold. The container is then cooled and ejected. The two-stage or reheat injection stretch blow molding process completely separates the preform injection molding operation from the blow molding operation. For example, the two operations may be carried out in different locations by different manufacturers, with a substantial time interval between them. On the other hand, the process involves two heating operations, resulting in a greater energy use and increased heat history in the polymer. Another disadvantage is the need to store and handle preforms.

Injection stretch blow molding processes use hollow preforms produced by injection molding. The preform is short and thick-walled relative to the finished blown article. The neck profile complete with screw thread is entirely formed by injection molding and is not modified by the blowing process. The other end of the preform is closed and typically dome shaped. Further, the design and precision of the preform has a critical influence on the degree of orientation and quality of the blown article. The actual wall thickness and any profiling depends on the shape and size of the blown container Like other preform processes, the finished blown article is free of seams, flash, and pinch-off scrap, and is characterized by precise neck dimensions. The injection molded preform may be converted to a blow molding either by the single-stage or the two-stage process.

Embodiments disclosed herein are related to the blowing stage of the above-mentioned injection or injection stretch blow molding processes. More specifically, embodiments disclosed herein are directed to an improved blow nozzle with a plurality of holes configured to provide directional blowing of the preform to obtain a blown container.

The preform may consist of all plastics suitable for the injection blow molding or injection stretch blow molding process. For example, such plastics may include PET (polyethylene terephthalate), PET-G, HDPE, PP, PVC or also a filled plastic.

As shown in FIG. 1, a blow nozzle (100) is depicted. The nozzle is made up of a tube on which the blow molding end (tip of the nozzle) is contracted so that this end may be inserted into the opening of the preform. The end of the nozzle may have the cross section of a truncated cone, for example.

In one or more embodiments, the blow nozzle (100) includes a tube having three layers of solid plastic (102, 104, 106), where each layer starting from the top is radially narrower with a smaller diameter. Thus, as shown in FIG. 1, layer (102) is the widest with the largest diameter, and layer 106 is the smallest in diameter. At the bottom of layer 106, a beveled portion (108) exists which has multiple holes (110) that are angled for directional blowing of compressed air. In one or more embodiments, the plurality of holes of the blow nozzle are angled so that the compressed air forms the shelf of the container first. The shelf of the contain is the angular section before the upper attachment point of the handle. The air then blows straight downward to form the remainder of the container.

In one or more embodiments, as described below with respect to FIG. 9, layers 104 and 106 of the blow nozzle are inserted into the mouth of the preform, at the threaded neck portion. The nozzle (100) is inserted until layer (102) rests on the threaded neck portion of the preform.

Figure 2:
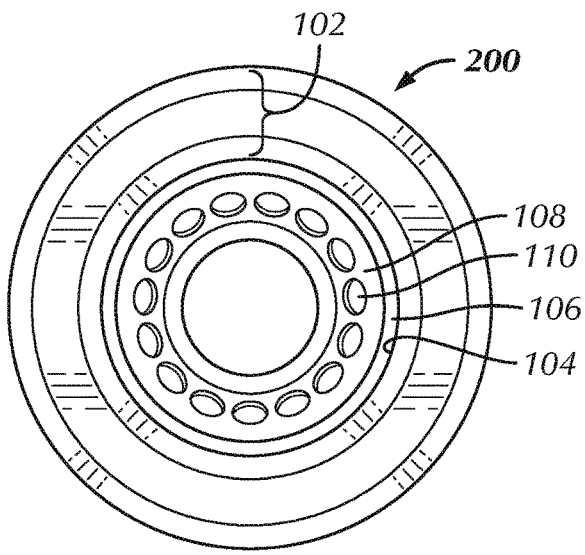
FIG. 2 depicts a blow nozzle for directional blowing of a preform into a container as seen from the top in accordance with one or more embodiments disclosed herein.

FIG. 2 shows a top view of the nozzle (200) in accordance with one or more embodiments. In FIG. 2, it can be seen that there are 15 holes (110) on the beveled portion (108) of the blow nozzle. Dashed lines indicate the various layers (2, 104 and 106) of the nozzle.

Figure 3:
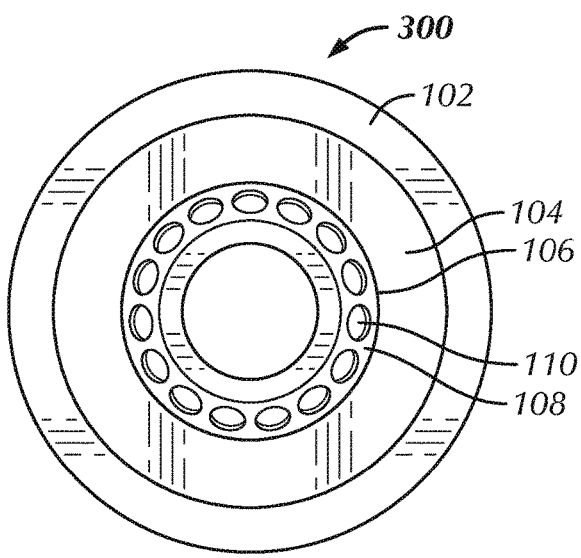
FIG. 3 depicts a blow nozzle for directional blowing of a preform into a container as seen from the bottom in accordance with one or more embodiments disclosed herein.

FIG. 3 shows a bottom view of the nozzle (300) in accordance with one or more embodiments. In FIG. 3 the 15 holes (110) can be seen on beveled portion (108). Layers (104, 106) of the nozzle tube are also depicted.

Those skilled in the art will appreciate that there may be any number of suitable holes on the angled, beveled portion of layer 106 of the blow nozzle (100, 200, 300). For example, while FIGS. 2-3 show 15 holes, there may be fewer or more than 15 holes for directional or non-directional blowing of compressed air to form a container, and the invention is not limited to that which is shown in the drawings. Further, those skilled in the art will appreciate that the angle of the beveled portion of the blow nozzle may be adjustable to directionally blow air at different angles.

Figure 4:
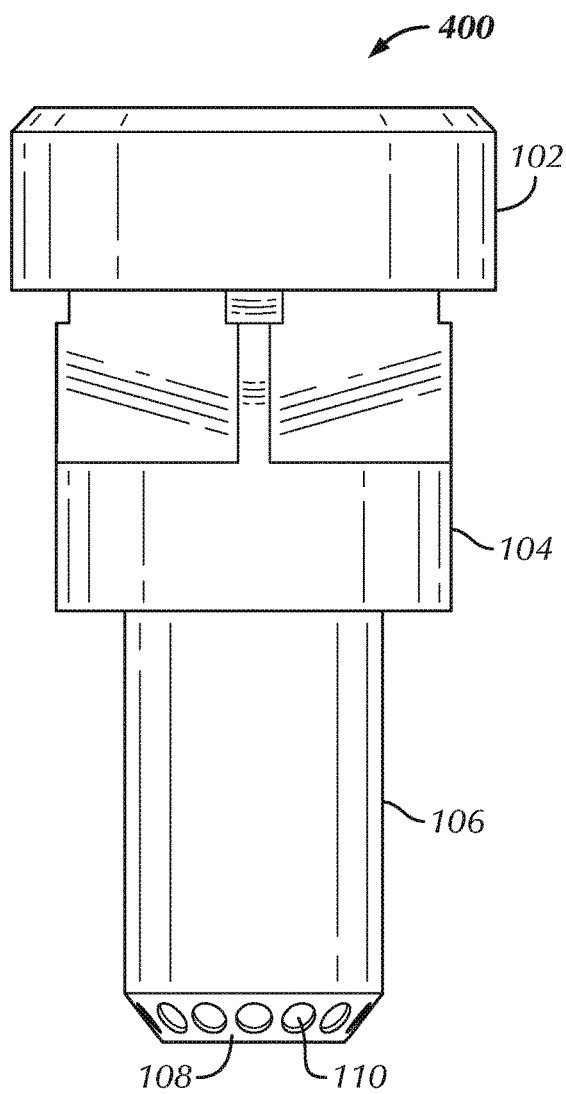
FIGS. 4-6 depicts a blow nozzle for directional blowing of a preform into a container from the front, left/right, and the back, respectively in accordance with one or more embodiments disclosed herein.
Figure 5:
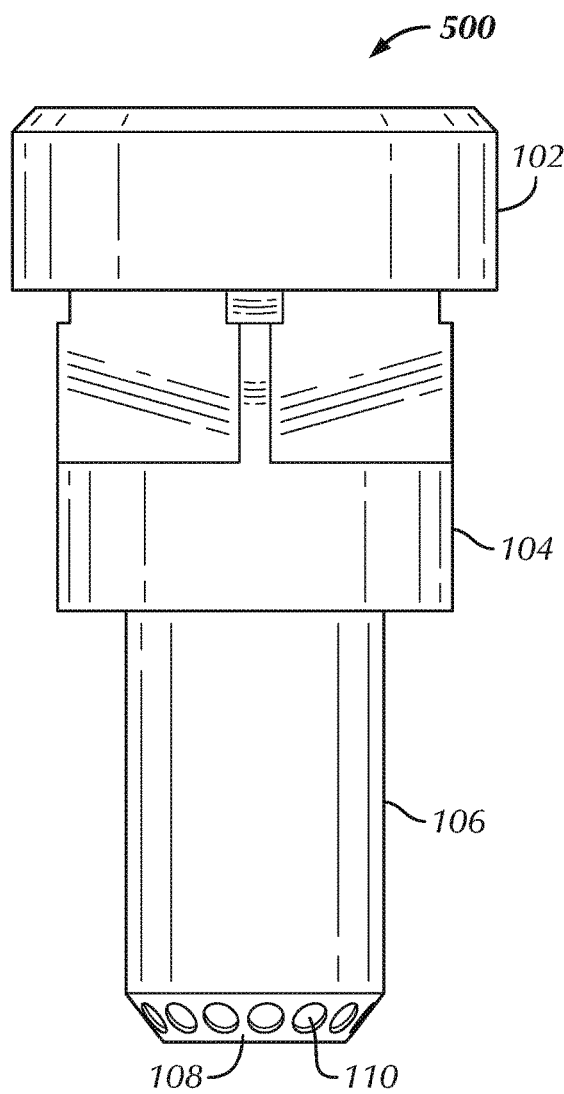
Figure 6:
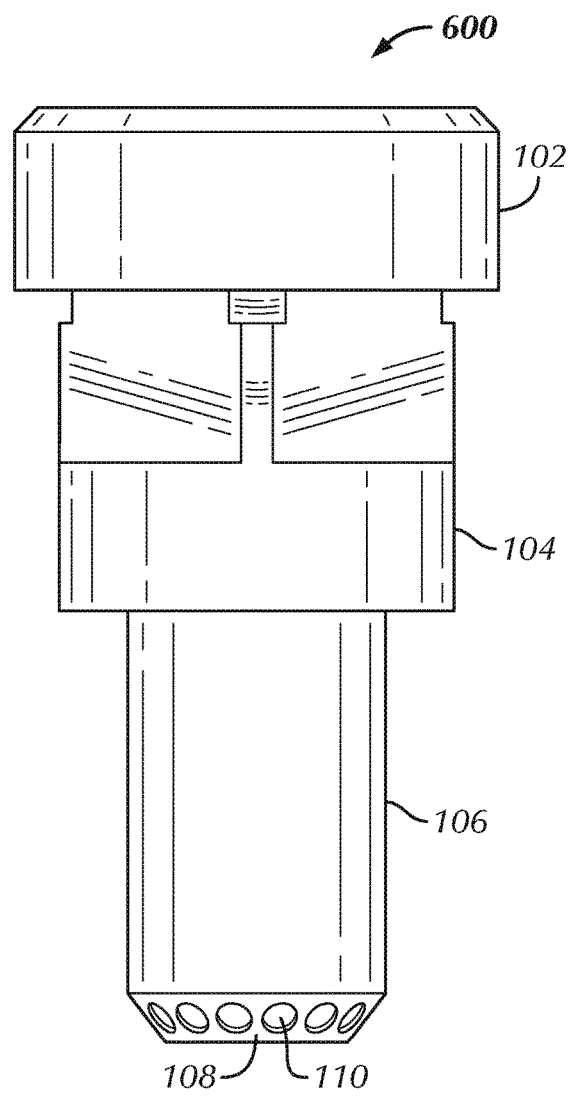

FIGS. 4-6 show the blow nozzle (400, 500, 600) from the front, left/right, and back, respectively. The blow nozzles (400, 500, 600) have the same three layers shown in the previous drawings (102, 104, 106), and the same beveled portions (108) with a plurality of holes (110) in each. To distinguish between the perspective views, when looking at the plurality of holes (110) on the beveled portion (108) of the nozzles (400, 500, 600), a slight difference can be seen in the portion of the holes that are depicted between each of the perspective views of FIGS. 4-6. For example, six (6) complete holes are shown in the left/right and back images (FIGS. 5 and 6), while only five (5) holes can be seen in the front view of FIG. 4.

Figure 7:
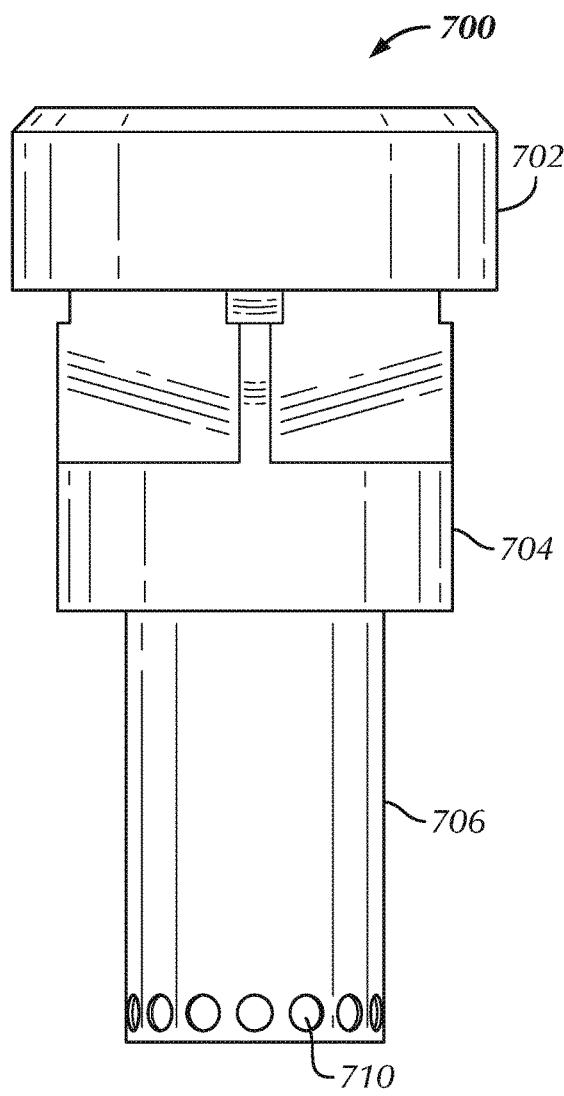
FIG. 7 depicts a blow nozzle without a bevel for blowing of a preform into a container in accordance with one or more embodiments disclosed herein.

Those skilled in the art will appreciate that the plurality of holes of the blow nozzle may be oriented in different ways, and the invention is not limited to angled holes disposed on a beveled portion at the bottom of the nozzle tube. For example, FIG. 7 shows a blow nozzle (700) in accordance with one or more embodiments. The blow nozzle (700) has the same three layers shown in the previous drawings (702, 704, 706). In FIG. 7, the holes (710) are not angled on a beveled portion of the nozzle tube. Rather, the holes (710) are disposed around the bottom edge of the bottom layer (706) of the blow nozzle (700). Again, there may be any suitable number of holes in the blow nozzle of FIG. 7. In addition, while the holes are shown aligned at the bottom of layer (706), those skilled in the art will appreciate that the holes may be distributed along any part of layer (706), and do not necessarily have to be only at the bottom of the layer (706). For example, although not shown in FIG. 7, the holes of the blow nozzle in accordance with one or more embodiments may be distributed at random positions along any part of layer 706, and do not necessarily require any alignment.

Those skilled in the art will appreciate that when the holes are not angled as shown in FIG. 7, the shelf of the container may not be formed first when the compressed air is blown through the holes.

Figure 8:
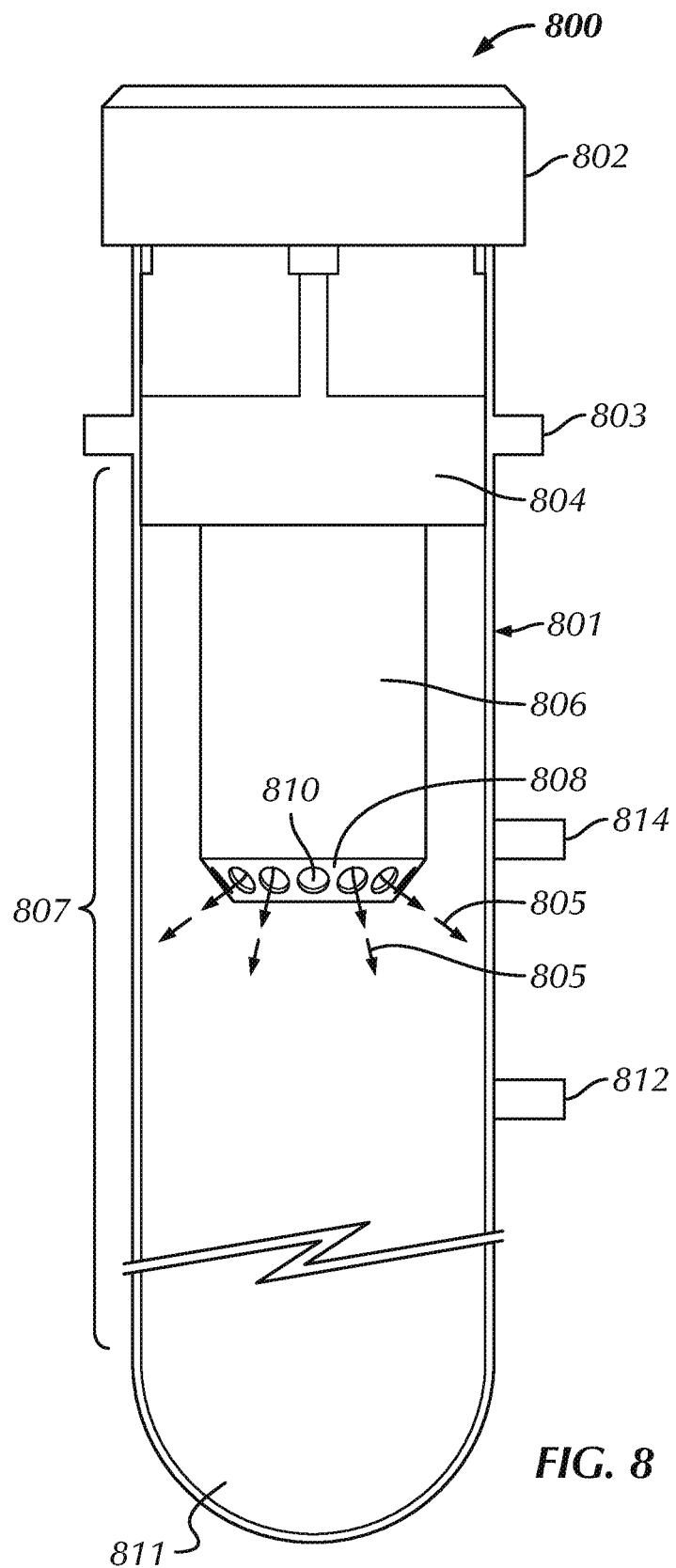
FIG. 8 depicts a blow nozzle inserted into a preform for blowing of the preform into a container in accordance with one more embodiments disclosed herein.

FIG. 8 shows a blow nozzle (800) inserted into a preform (801) in accordance with one or more embodiments. The preform (801) is for a container made of orientable thermoplastic material and arranged so that the resultant blown container (not shown) includes a handle (not shown) attached to upper and lower attachment points (806, 812) of the preform (801). The preform (801) includes a molded structure with walls constituting a main body (807), a threaded neck portion which cannot be seen in FIG. 8 as it is covered by the inserted blow nozzle (800), and a semi-spherical, curved end portion (811) formed at the bottom of the preform (801). The main body is hollow and cylindrical, and the inner surface of the main body forms an inner cavity into which a stretch rod is placed for stretching the preform during injection stretch blow molding. The threaded neck portion is non-expandable and the main body (807) of the preform (801) is an expandable portion below the neck. The neck typically includes a handling/fixing ring (803) above the expandable portion of the main body (807).

According to one or more embodiments of the present invention, the preform 801 may be formed with an integral handle (not shown). More specifically, the preform may have an integrally molded solid handle attached at 2 points along the vertical axis (806, 812). The first, upper point of attachment (806) may be either at the non-expandable portion of the preform or the expandable portion of the preform. The second, lower point of attachment (812) is at the expandable portion of the preform. The approximate length of the desired handle in the finished container determines the length of the handle. Therefore, the shape of the attached handle may be of various geometries to accommodate the desired handle length.

Those skilled in the art will appreciate that while the main body (807) is shown in FIG. 8 as having a uniformly thick wall, the preform (801) may be any suitable preform having variable thickness at portions of the main body and/or a tapered section in the middle of the main body. For example, the preform (801) may have a thread stop formed below the neck portion, and a tapered portion connecting the main body (807) and the thread stop, with a taper transition between the main body (807) and the tapered portion. According to one or more embodiments, the preform may have an inner circumference of the end transition including a small ring-shaped notch for engagement with a stretch rod.

Those skilled in the art will appreciate that there may be many ways in which to have an integrated handle of the preform, without departing from embodiments disclosed herein. For example, in an alternate version of the preform, the preform could be molded with a handle that is shorter than the finished handle. The handle itself may be stretched to the desired length with the stretch rod. The preform handle may also be achieved by mechanical means by physically attaching the handle to the preform outside the injection molding process or by coinjecting the handle on the preform. In other embodiments, the sequence of the injection stretch operations may be modified. For example, when the oriented preform is sequenced into the molding station the molds close, and the stretch rod may be extended. However, prior to blowing the container, handle pockets in the mold extend to capture the handle. When the container is blown, the handle pocket move to the finished container requirements. The movable mold segments within the blow mold cavity may be unitary segments or may themselves consist of multiple parts.

The blow nozzle (800) has the same three tube layers (802, 804, 806), with layer 806 having the beveled portion (808) and the plurality of holes (810). As shown in FIG. 8, when inserted, in one or more embodiments, the end of the blow nozzle (800) with holes (810) is disposed just below the upper attachment point (806) of the integrated handle of the preform. When the blow nozzle (800) is used to blow compressed air into the preform (801) to form the container, the air blows out of the plurality of holes (810) directionally (as indicated by the arrows 805), as a result of the angular disposition of the plurality of holes (810) on the blow nozzle (800). In one or more embodiments, this directional blowing (805) allows for the preform to form the shelf of the container first, and then the air continues to directionally blow the remainder of the container below the shelf portion.

Those skilled in the art will appreciate that depending on where the plurality of holes are disposed on the blow nozzle and at which angles the holes are disposed (if any), the nozzle may be inserted higher or lower than just below the upper attachment point of an integrated handle of the preform, without departing from embodiments disclosed herein. Further, those skilled in the art will appreciate that if the container does not have a defined shelf, which is the sloped portion of the container typically at or above the upper attachment point of the integral handle, the blow nozzle may be used to directionally blow/inflate any shaped container, such as a container have a straight wall without any sloped portion, without departing from embodiments disclosed herein.

Figure 9:
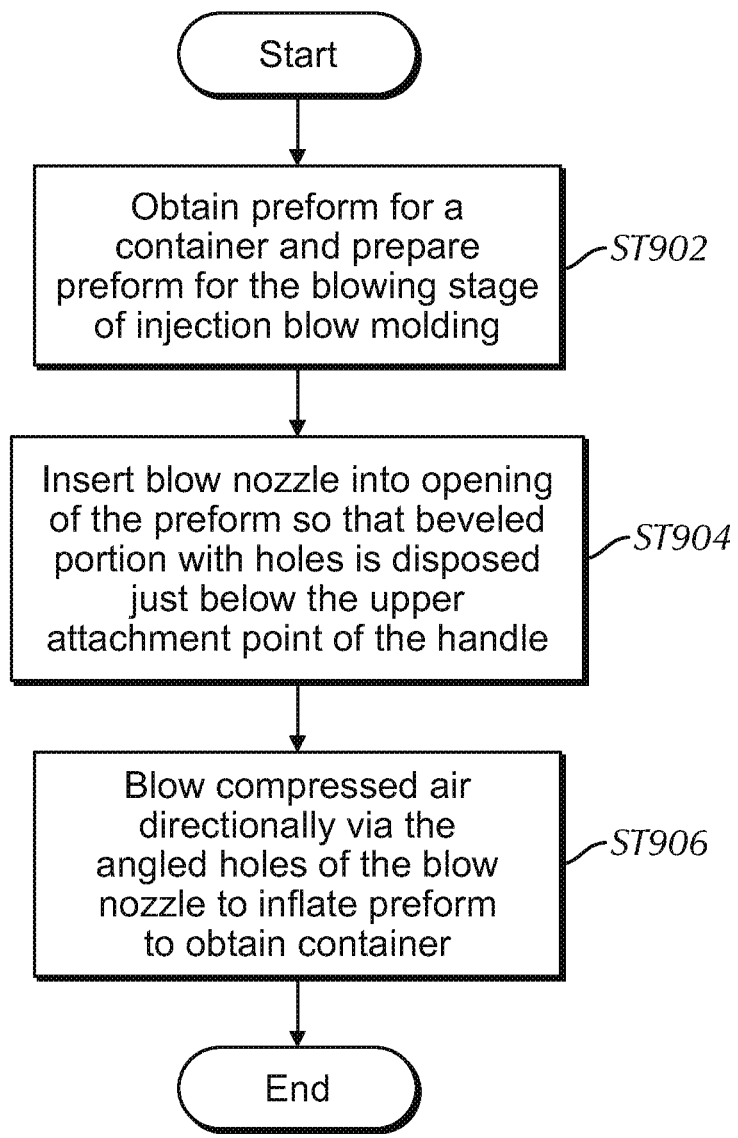
FIG. 9 depicts a flow chart for a method of blowing a preform into a container using a blow nozzle in accordance with one or more embodiments disclosed herein.

FIG. 9 shows a method flow chart for obtaining a container from a preform using a blow nozzle according to embodiments disclosed herein. In Step 902, the set-up process occurs to obtain and ready the preform for the blowing stage of injection blow molding, which results in a blown container for carrying fluid or other materials. More specifically, a preform is obtained either by injection of the plastic material in an injection and forming mold, or by extrusion of the plastic material in a forming mold. The preform is then subjected to an appropriate thermal treatment, depending on the characteristics of the container to be obtained, and/or is placed in a finishing mold containing the shape of the container to be obtained.

In one or more embodiments, at the blowing stage, the blow nozzle is introduced into the opening (the neck) of the preform such that the beveled portion with the plurality of holes is disposed just below the upper attachment point of the integrated handle on the preform (Step 904). In other words, the uppermost layer of the nozzle (102 in the FIGs. above) sits on the opening of the preform, and the bottom of the nozzle rests between the upper and lower integrated handle attachment points, closer to the upper attachment point. Next, a blowing fluid, generally air under high pressure, is injected into the preform to inflate it and coat the walls of the mold with the material, thus making it possible to obtain the container (Step 906). Those skilled in the art will appreciate that Step 906 may be a two-stage step, in which air is first blown into the preform in a pre-blowing stage at low pressure, and then within milliseconds, the high pressure compressed air follows.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A blow nozzle for supplying compressed air to the internal cavity of a preform, the blow nozzle comprising:
   a tube comprising a first layer, a second layer, and a third layer, the first layer being radially wider and having a larger diameter than the second layer, the second layer being disposed between the first and third layers, and the second layer being radially wider and having a larger diameter than the third layer;
   a plurality of holes disposed on the third layer for directional blowing of the compressed air into the preform, when the nozzle is inserted into a neck opening of the preform and rests in a blow molding position; and
   a beveled portion of the tube at the bottom of the third layer, the beveled portion of the tube comprising the plurality of holes disposed at an angle, wherein the compressed air flows downward from the first layer to the second layer and then out through the beveled portion of the third layer.

2. The blow nozzle of claim 1, wherein the plurality of holes are disposed at the angle at a bottom of the third layer of the nozzle tube.

3. The blow nozzle of claim 2, wherein the plurality of holes are aligned at the bottom of the third layer of the nozzle tube.

4. The blow nozzle of claim 3, wherein the directional blowing of the compressed air forms a sloped shelf of the container first, and then continues to inflate the preform to form the base of the container thereafter.

5. The blow nozzle of claim 1, wherein the tube comprises a through-opening for carrying the compressed air into the preform.

6. The blow nozzle of claim 1, wherein the plurality of holes are randomly distributed across the third layer of the nozzle tube.

7. The blow nozzle of claim 1, wherein when the blow nozzle is inserted into the preform, the blow molding position consists of the bottom of the second layer of the tube resting on a threaded neck portion of the preform.

8. The blow nozzle of claim 7, wherein the blow nozzle rests such that the plurality of holes are disposed just below an upper attachment point of an integral handle of the preform.

9. The blow nozzle of claim 7, wherein the blow nozzle rests such that the plurality of holes are disposed between an upper attachment point and an lower attachment point of an integral handle attached on the exterior wall of the preform.

10. A method for inflating a container from a preform using a blow nozzle, comprising:
   obtaining a blow nozzle comprising:
      a tube comprising a first layer, a second layer, and a third layer, the first layer being radially wider and having a larger diameter than the second layer, the second layer being disposed between the first and third layers, and the second layer being radially wider and having a larger diameter than the third, and
      a plurality of holes disposed on the third layer of the blow nozzle for directional blowing of the compressed air into the preform;
   inserting the blow nozzle into the preform into a blow molding position such that the bottom of the third layer of the blow nozzle is between an upper attachment point of a handle of the preform and a lower attachment point of the handle, just below the upper attachment point of the handle; and
   flowing compressed air through the plurality of holes of the blow nozzle such that the plurality of holes facilitates directional blowing of the compressed air to form the container.

11. The method of claim 10, wherein the blow nozzle further comprises: a beveled portion of the tube at the bottom of the third layer, the beveled portion of the tube comprising the plurality of holes disposed at an angle, and wherein the method further comprises:
   using the directional blowing of the compressed air to form a sloped shelf of the container; and
   continuing to inflate the preform to form the base of the container after forming the sloped shelf.

12. The method of claim 11, wherein the plurality of holes is aligned at a bottom of the third layer, and the angle at which the plurality of holes is disposed is adjustable.

13. The method of claim 10, wherein the plurality of holes is disposed at the angle at the end of the third layer of the nozzle tube.

14. The method of claim 10, wherein when the blow nozzle is inserted into the preform, the blow molding position consists of the bottom of the second layer of the tube resting on a threaded neck portion of the preform.

15. The method of claim 10, wherein the plurality of holes are randomly distributed across the third layer of the nozzle tube.

16. A blow nozzle for supplying compressed air to the internal cavity of a preform, the blow nozzle comprising:
   a tube comprising a first layer, a second layer, and a third layer, the first layer being radially wider and having a larger diameter than the second layer, the second layer being disposed between the first and third layers, and the second layer being radially wider and having a larger diameter than the third layer; and
   a plurality of holes disposed on the third layer for directional blowing of the compressed air into the preform, when the nozzle is inserted into a neck opening of the preform and rests in a blow molding position,
   wherein the plurality of holes are randomly distributed across the third layer of the nozzle tube.

* * * * *